(12) United States Patent
Beidl et al.

(10) Patent No.: US 11,608,047 B2
(45) Date of Patent: Mar. 21, 2023

(54) METHOD FOR OPERATING A VEHICLE WITH A HYBRID DRIVE TRAIN

(71) Applicant: Technische Universität Darmstadt, Darmstadt (DE)

(72) Inventors: Christian Beidl, Darmstadt (DE); Raja Sangili Vadamalu, Darmstadt (DE); Sakthivel Pavithiran, Bürstadt (DE)

(73) Assignee: Technische Universität Darmstadt, Darmstadt (DE)

(*) Notice: Subject to any disclaimer, the term of this patent is extended or adjusted under 35 U.S.C. 154(b) by 32 days.

(21) Appl. No.: 17/503,434

(22) Filed: Oct. 18, 2021

(65) Prior Publication Data
US 2022/0118965 A1    Apr. 21, 2022

(30) Foreign Application Priority Data
Oct. 19, 2020   (DE) .................. 10 2020 127 512.9

(51) Int. Cl.
*B60W 20/12*   (2016.01)
*B60W 20/16*   (2016.01)

(52) U.S. Cl.
CPC ............ *B60W 20/12* (2016.01); *B60W 20/16* (2016.01); *B60W 2510/244* (2013.01);
(Continued)

(58) Field of Classification Search
CPC ...... B60W 20/12; B60W 20/16; B60W 20/19; B60W 20/13; B60W 2510/244;
(Continued)

(56) References Cited

U.S. PATENT DOCUMENTS

| | | | |
|---|---|---|---|
| 2008/0319596 A1* | 12/2008 | Yamada | B60L 50/61 903/930 |
| 2011/0066308 A1* | 3/2011 | Yang | B60W 10/08 701/22 |

(Continued)

FOREIGN PATENT DOCUMENTS

| | | |
|---|---|---|
| DE | 102005022210 A1 | 11/2006 |
| DE | 102007045031 A1 | 4/2008 |

(Continued)

OTHER PUBLICATIONS

Wilde, Andreas. A modular function architecture for adaptive and predictive energy management in hybrid electric Vehicles; Eine modulare Funktionsarchitektur fuer adaptives und vorausschauendes Energiemanagement in Hybridfahrzeugen. Germany.

*Primary Examiner* — George C Jin
(74) *Attorney, Agent, or Firm* — Smartpat PLC

(57) ABSTRACT

The operation of a hybrid powertrain system is optimized with respect to a desired state-of-charge trajectory, taking account of the estimated anticipated vehicle drive power. The hybrid powertrain system has an internal combustion engine and an electrically operated torque machine. The internal combustion engine and the torque machine are controlled by a control device and are connected to an output element via a hybrid transmission. Before the start of the prediction period Δt, an experience-based state-of-charge trajectory for the anticipated route, covering at least the prediction period Δt, is retrieved from an external database. The desired state-of-charge trajectory is established based on the experience-based state-of-charge trajectory by modifying it with at least one optimization constraint. The experience-based state-of-charge trajectory can be established based on operating data from hybrid powertrain
(Continued)

systems of multiple vehicles and/or from operating data from multiple comparable journeys with the same vehicle.

14 Claims, 4 Drawing Sheets

(52) U.S. Cl.
CPC ... *B60W 2510/246* (2013.01); *B60W 2555/20* (2020.02); *B60W 2556/45* (2020.02)

(58) Field of Classification Search
CPC ....... B60W 2510/246; B60W 2555/20; B60W 2556/15; B60W 2050/0013; B60W 2520/10; B60W 2540/10; B60W 2552/15; B60W 2556/10; B60W 2710/0666; B60W 2710/083; B60K 6/48; G01C 21/3469
See application file for complete search history.

(56) References Cited

U.S. PATENT DOCUMENTS

| | | | |
|---|---|---|---|
| 2013/0268150 | A1* | 10/2013 | Weslati ................. B60W 10/26 701/1 |
| 2015/0291150 | A1 | 10/2015 | Sujan et al. |
| 2016/0297423 | A1* | 10/2016 | Blasinski ........... G01C 21/3469 |
| 2019/0047572 | A1 | 2/2019 | Bennett et al. |
| 2020/0070679 | A1* | 3/2020 | Wang ..................... B60L 58/21 |
| 2020/0271470 | A1 | 8/2020 | Symanow et al. |

FOREIGN PATENT DOCUMENTS

| | | |
|---|---|---|
| DE | 102013016569 A1 | 4/2015 |
| DE | 102010036148 | 8/2017 |
| DE | 102016201232 A1 | 8/2017 |
| DE | 102020104693 A1 | 8/2020 |
| EP | 2692604 B1 | 4/2015 |
| WO | 2021239402 A1 | 12/2021 |

* cited by examiner

METHOD FOR OPERATING A VEHICLE WITH A HYBRID DRIVE TRAIN

CROSS-REFERENCE TO RELATED APPLICATION

The present patent application claims priority to German patent application DE 10 2020 127 512.9, filed 19 Oct. 2020, the contents of which is hereby incorporated by reference.

TECHNICAL FIELD

The disclosure relates to a method for operating a vehicle with a hybrid powertrain system, the hybrid powertrain system having a non-electrically operated drive motor and an electrically operated torque machine that is connected to an energy storage device in an energy-transferring manner.

BACKGROUND

The powertrain of a vehicle can comprise all the components that generate the power for the drive in the vehicle and transmit it to the vehicle's driving path. A powertrain can include, for example, a rigid drive shaft or a flexible drive belts for transmitting a torque that drives the vehicle. Vehicles can be operated with various torque-generating devices, with which a torque for a drive power that drives the vehicle can be generated from a form of energy stored in the vehicle. Attempts are regularly made to ensure that the torque-generating device in question is operated as efficiently as possible, to enable the vehicle to be driven for as long or as far as possible based on the energy stored in the vehicle.

In the case of vehicles with a hybrid powertrain system, the vehicle has two different torque-generating devices, which can be operated with two different forms of energy. While the vehicle is operating, the favorable form of energy or an advantageously useable torque-generating device for a current driving situation or with regard to a predefined target criterion can be used by a suitably configured control unit. In many different operating situations, it is advantageous for the respective contributions of the two torque-generating devices to be continuously adjusted to the given driving situations, to individual driving characteristics, or to other target criteria. In addition, one of the two torque-generating devices can also be switched off at times and the drive power needed for the desired driving situation generated and made available exclusively by the torque-generating device that has not been switched off. In the case of hybrid powertrain systems too, using the total available energy as efficiently as possible will often be paramount and will be an important target value for controlling an optimized operation of the hybrid powertrain system. Moreover, attempts are frequently also made to optimize other parameters, such as for example reducing an undesired emission of pollutants, increasing an exclusively electrically operated range, or improving or maintaining for as long as possible the state of health of the energy storage device.

In many vehicles with a hybrid powertrain system, the hybrid powertrain system has an internal combustion engine as the non-electrically operated drive motor and at least one electrically operated torque machine. The internal combustion engine can conventionally be operated with a liquid fuel such as gasoline. The electrically operated torque machine can be a DC motor, for example, which can also be operated as a generator. The torque machine is connected to an electrical energy storage device in an energy-transferring manner, usually an electric battery system or a fuel cell. In a hybrid drive, the drive power can be generated either by the drive motor, by the torque machine, or by both at the same time, wherein if the drive motor and the torque machine are used at the same time, the proportion of the total drive power transferred in each case to an output element can be varied and can be adjusted to a predefined target value. In addition, the torque machine can also be operated temporarily as a generator in order to convert a proportion of the kinetic energy of the vehicle into electrical energy, during braking for example, and to feed it into the appropriate energy storage device. If the hybrid powertrain system has a plurality of electrically operated torque machines, the plurality of torque machines can often be controlled and operated independently of one another, wherein individual or all torque machines can also be connected to the energy storage device in an energy-transferring manner, in order to be able to convert kinetic energy into electrical energy and store it.

The operation of the hybrid powertrain system is controlled by the control device. It is customary here to seek to optimize the operation with respect to one or more target values, such as the energy consumption or the use of the forms of energy that are currently stored in the vehicle, using a continuous optimization process. In many cases, the state of charge is an advantageous target value for optimization. By specifying a desired state-of-charge trajectory for a variation in the state of charge of the energy storage device over time, the contribution of the electrically operated torque machine and correspondingly also the contribution of the internal combustion engine to the total required drive power can be specified and controlled at any time during operation.

The specification of a desired state-of-charge trajectory can be improved with regard to the target value in question by estimating, while the hybrid powertrain system is operating, the anticipated driving path load within a prediction period and using this to estimate an anticipated vehicle drive power that is likely to be needed over the prediction period in order to move the vehicle in accordance with a driver's instructions. For the purpose of estimating an anticipated driving path load within the forthcoming prediction period, the current vehicle location and a driving path that is likely to be chosen can be determined using global position sensors (GPS) and digital map systems, for example. Then, based for example on the road and speed profiles established for the driving path that is likely to be chosen, in particular height and speed profiles, the likely driving path load can be estimated as one of the parameters for an anticipated vehicle drive power within the prediction period. Based on the estimated vehicle drive power that is likely to be required from the hybrid powertrain system within the prediction period, appropriate control strategies and power management schemes can then be used to specify and control the use of the electric torque machine and the internal combustion engine respectively, such that the one or more target values of the optimization process used therefor are achieved in the best possible way, it being usually desirable for the energy consumption for the drive power transferred to the output element to be as low as possible.

The optimization processes that are commonly used in practice require the modelling of the hybrid powertrain system during the driving situations that arise to be as realistic as possible. In many cases, a multi-criteria optimization is carried out here. Using scalarization, the optimization can be performed with a linear or non-linear optimization process. However, to ensure that the hybrid powertrain system is operated as efficiently as possible, both the modelling and the optimization require considerable effort. Under favorable conditions, on an anticipated driving path, the energy expenditure needed to move the vehicle along the driving path can then be optimized or minimized if the energy expenditure is set as a target value of the optimization. Additional target values can also be specified and optimized Along with minimizing the energy consumption, taking account at the same time of further optimization target values as well as minimizing the pollutant emissions generated during operation, for example, is also known and is the subject of intensive research activities. Pollutant emissions can be taken into account both in modelling and in the optimization processes, and this significantly increases the overall effort involved in optimization. Additional target values can include, for example, temperature management for the hybrid powertrain system or state optimization for the energy storage device.

While the hybrid powertrain system is running, the energy consumption can often be minimized and an efficient operation of the hybrid powertrain system achieved when the vehicle is moving as expected along a specified or accurately estimated driving path. In addition, depending on the chosen optimization process, the pollutant emissions can also be minimized or additional target values for an optimized operation of the hybrid powertrain system taken into consideration.

It has been found that better optimization results can often be achieved with a longer prediction period. However, a longer prediction period requires larger volumes of data and results in increased computational effort. With the presently available capacities of an electronic data processing system in a vehicle, a prediction period of a few minutes is achievable. However, as soon as the prediction period is extended, to more than 10 minutes for example, the effort involved in collecting and processing the volume of data increases disproportionately.

Experience has shown that the length of the prediction period can be adjusted depending on the anticipated route and other boundary conditions. Such an adjustment enables the operating mode of the hybrid powertrain system to be adjusted dynamically according to the current conditions. However, such adjustments often lead to only slight improvements.

The use of control devices with self-learning characteristics is also known. Here, the vehicle performance data corresponding to routes already travelled can be stored. A new anticipated route can be compared with already stored routes in order to improve the optimization and control of the hybrid powertrain system based on the stored vehicle performance data. The effort required is relatively great, however.

SUMMARY

A problem addressed by the present disclosure is considered to be that of developing a method described above in such a way that as advantageous an operation of the hybrid powertrain system as possible can be achieved, with the minimal possible effort in the vehicle.

A method for operating a vehicle with a hybrid powertrain system, the hybrid powertrain system having a non-electrically operated drive motor and an electrically operated torque machine that is connected to an energy storage device in an energy-transferring manner. The drive motor and the torque machine are controlled by a control device and connected to an output element via a hybrid transmission.

The method comprises estimating an anticipated driving path load for a prediction period on the basis of an anticipated route, establishing a desired state-of-charge trajectory for a variation in the state of charge of the energy storage device over time, and optimizing the operation of the hybrid powertrain system with respect to the desired state-of-charge trajectory, taking account of the estimated anticipated vehicle drive power, using an optimization process and controlling said operation with the control device.

Before the start of the prediction period, an experience-based state-of-charge trajectory for the anticipated route, covering at least the prediction period, is retrieved from an external database, and the desired state-of-charge trajectory is established on the basis of the experience-based state-of-charge trajectory by modifying it with at least one optimization constraint. By accessing an external database and using state-of-charge trajectories stored therein, an experience-based state-of-charge trajectory for a long prediction period can be retrieved and made available for an optimization process with relatively little data processing effort in the vehicle.

Moreover, the experience-based state-of-charge trajectory may have been established from previous modelling and optimization processes and possibly already modified taking account of additional known information, these modelling and optimization processes having been carried out outside the vehicle and possibly long before the retrieval of the experience-based state-of-charge trajectory from the external database, in central data processing facilities for example, which are in data communication with the external database. Since the necessary calculations are performed outside the vehicle, the effort required in the vehicle can be minimized.

Then, based on the experience-based state-of-charge trajectory established outside the vehicle, the experience-based state-of-charge trajectory is modified in the vehicle by means of at least one optimization constraint to enable the desired state-of-charge trajectory to be adjusted as far as possible to the present driving situation. In this way, unusual traffic situations such as a traffic jam or roadworks can be taken into consideration. It is also possible to take account of current vehicle performance data, environmental conditions or a driver's instructions. The desired state-of-charge trajectory established in this way can then be used to operate the hybrid powertrain system with conventional optimization processes and with the aid of the control device in such a way that the desired state-of-charge trajectory is achieved or implemented.

The experience-based state-of-charge trajectory retrieved from the external database can cover a period of any desired length. Thus, after entering the desired destination for the forthcoming use of the vehicle, for example, the experience-based state-of-charge trajectory can cover the entire route. Provided that the driver does not deviate from the route in question during the journey to the desired destination, the essential foundation for the subsequent establishment of the desired state-of-charge trajectory for this journey can be made available with a single retrieval. The experience-based state-of-charge trajectory is necessarily longer than a prediction period that is specified during the operation of the hybrid powertrain system for optimizing the operation of the hybrid powertrain system, so that, based on the experience-based state-of-charge trajectory, a desired state-of-charge trajectory covering the whole prediction period can be established, forming the foundation for the optimized operation of the hybrid powertrain system.

In this way, the effort required in the vehicle for acquiring the experience-based state-of-charge trajectory and for establishing or adjusting the desired state-of-charge trajectory can be kept very low, even though a very large amount of information can be taken into consideration and also a great deal of modelling and optimization work can be carried out in advance in establishing the experience-based state-of-charge trajectory.

It is also possible to specify a large number of individual information data points per unit time for the experience-based state-of-charge trajectory, since the experience-based state-of-charge trajectory can be established in advance using external data processing facilities and only the volume of data necessary for the experience-based state-of-charge trajectory has to be transferred to the vehicle. Fewer information data points per unit time or support points for the subsequent optimization processes can then be used in establishing the desired state-of-charge trajectory. The effort required in the vehicle to operate the hybrid powertrain system can be further reduced in this way, without adversely affecting the quality of the operation.

It is optionally provided that the experience-based state-of-charge trajectory was established on the basis of operating data from hybrid powertrain systems of multiple vehicles. The experience-based state-of-charge trajectory thus contains information from multiple vehicles. The experience-based state-of-charge trajectory can represent an average state-of-charge trajectory, in which the state-of-charge trajectories of a number of vehicles that are comparable in terms of a vehicle parameter are averaged or taken into consideration using a suitable method. It is also possible, using additional parameters such as individual driving behavior or environmental conditions over the route, to take greater account of or to preferentially select stored state-of-charge trajectories that have greater congruence with the additional parameters.

According to an advantageous embodiment, it is provided that the experience-based state-of-charge trajectory retrieved from the database is selected from a number of state-of-charge trajectories stored in the database, wherein at least one vehicle parameter of the hybrid powertrain system is used as a selection criterion for the selection. Using the vehicle parameter, the most appropriate state-of-charge trajectory for the vehicle type in question can be selected, for example. If a number of state-of-charge trajectories are available for the vehicle type in question, additional vehicle parameters such as previous driving paths or an age of the hybrid powertrain system can be taken into consideration.

Alternatively or in addition to taking account of vehicle parameters, it can optionally be provided that the experience-based state-of-charge trajectory retrieved from the database is selected from a number of state-of-charge trajectories stored in the database, wherein at least one journey parameter established on the basis of at least one operating parameter of the vehicle, established during at least one past journey with the vehicle, is used as a selection criterion for the selection. Where appropriate, a number of the same or similar journeys carried out in the past with the same vehicle and possibly also with the same driver can be taken into consideration for a prior determination of the experience-based state-of-charge trajectory. This is possible and advantageous for commuters or for professional drivers making repeated journeys over the same route, for example, since the experiences from previous journeys with the same vehicle and possibly also with the same driver can be taken into account and used for optimum control of the hybrid powertrain system. In this way, the results of past journeys with the vehicle in question can be considered when selecting the experience-based state-of-charge trajectory, and the experience-based state-of-charge trajectory can be advantageously adjusted to the present circumstances of the vehicle in question.

According to a further advantageous embodiment, it can additionally be provided that at least one optimization constraint is specified by a driver before the start of the prediction period. Thus, for example, the driver can specify the quickest arrival time or shortest possible journey time, or the most energy-efficient driving style, so as to influence the control of the hybrid powertrain system during the journey.

In principle, a suitably specified optimization constraint can also bring about a temporary deviation of the desired state-of-charge trajectory from the experience-based state-of-charge trajectory to take account of short-term events or suddenly occurring situations which cannot be covered by the experience-based state-of-charge trajectory.

According to a particularly advantageous embodiment, it is provided that, taking account of the anticipated driving path load, an anticipated vehicle drive power is estimated, that at least one optimization constraint is specified for previously identified adverse operational events, that on the basis of the estimated anticipated vehicle drive power it is estimated whether an adverse operational event will occur within an event prediction period, and that if an adverse operational event is likely to occur over a time-limited event response time, at least one optimization constraint allocated to this adverse operational event is specified for controlling the operation of the hybrid powertrain system. Adverse operational events can be, for example, gear changes of the hybrid transmission while the internal combustion engine is running or an imminently necessary start-up of the internal combustion engine following an extended period of drive power being generated exclusively by the torque machine. With a suitably defined optimization constraint, for each adverse operational event the adverse operational situation can either be avoided or can be transformed into a less adverse operational situation.

Thus, for example, an undesirably high level of pollutant emissions by the internal combustion engine during a gear change can be significantly reduced by means of a time-limited change of a target parameter of the optimization as an optimization constraint. For example, to increase the proportion of drive power generated by the torque machine for a short time, the state of charge of the desired energy storage device can be significantly reduced for a limited time as an optimization constraint. As part of the optimization process, the proportion of electric drive power is then increased, since the optimization constraint allows electrical energy to be drawn from the energy storage device. At the same time, the proportion of drive power generated by the internal combustion engine is reduced correspondingly, as a consequence of which, for example, the pollutant emissions by the internal combustion engine can be reduced.

Since the time-limited event response time can be set to be much shorter than the total journey time and can be less than one minute or just a few seconds, for example, the desired state-of-charge trajectory can easily be adjusted over the journey time such that the deviations from the desired state-of-charge trajectory over the journey time brought about by the adverse operational events are very slight and the desired state of charge is achieved, especially at the end of the journey time. At the same time, the early recognition of adverse operational events enables the negative effects thereof to be mitigated, without these negative effects having to be fully modelled and taken permanently into account as additional parameters or target values in the optimization process.

Advantageously, it is provided that at least one previously defined adverse operational event would lead to an increased emission of pollutants and that the pollutant emission can be reduced by comparison by means of the allocated optimization constraint. Fully detecting and modelling the pollutant emissions during operation of the hybrid powertrain system and giving full and continuous consideration to the pollutant emissions through additional parameters or target values during optimization would be much more costly in comparison to the optimization processes that are used at present. However, the operational events that have a particularly adverse effect on pollutant emissions often last for only a relatively short time and can be identified and characterized in advance relatively well by measurements on a hybrid powertrain system in a vehicle test bench. The necessary measurements can also be carried out in an engine test bench or powertrain test bench where appropriate, thereby further reducing the cost. For a number of adverse operational events, it is possible to establish and define one or more optimization constraints, by means of which the optimization process can be influenced in such a way that pollutant emissions can be significantly reduced without leading to a marked increase in energy consumption or having a negative impact on the state of charge of the energy storage system over a significant period of time.

According to one embodiment, it is provided that, on the basis of a predefined prioritization, one of the optimization constraints allocated to these adverse operational events is selected and specified for controlling the operation of the hybrid powertrain system if more than one optimization constraint is allocated to the identified adverse operational event. Through a suitable prioritization, which can be developed and specified in advance, for example by means of measurements on a hybrid powertrain system in a vehicle test bench, the optimization constraint with which the negative effects of the adverse operational event can best be reduced or avoided can be chosen in a simple manner and with minimal effort.

In the same way, according to a further embodiment, it is provided that, on the basis of a predefined prioritization, an allocated optimization constraint is selected and specified for controlling the operation of the hybrid powertrain system if more than one adverse operational event is identified within the event prediction period. In an urban environment in particular, unforeseeable events such as suddenly changing traffic light signals, other road users, or quickly changing driving paths can mean that two or more adverse operational events are predicted or expected within the event prediction period or even within the event response time, such that differing or even contradictory optimization constraints might potentially be proposed for different adverse operational events, and with a suitable, usually probability-based, prioritization the optimization constraint that can best reduce the negative effects of the two or more adverse operational events can be identified and selected.

The prioritization can be defined by a one-dimensional weighting of the various optimization constraints, for example. It is also possible to determine and define in advance a multidimensional prioritization, such that the prioritization can be adjusted and defined for different target values. Moreover, it is conceivable that, during a driving situation, at least one parameter describing the driving situation is detected and, depending on the at least one detected parameter, a prioritization that is adjusted thereto or is intended for the detected parameter is used to select the optimization constraint.

With a view to a subsequent adjustment and improvement of the method, it is optionally provided that, while the hybrid powertrain system is operating, operating parameters are detected and that, on the basis of the detected operating parameters, the prioritization of the allocated optimization constraints is checked and if necessary is changed. The operating parameters, such as speeds, accelerations or preferred driving path decisions, enable an individual driving style to be recognized and the prioritization of the multiple possible optimization constraints to be changed and adjusted, depending on the individual adverse operational events. Thus, for example, a consumption-oriented driving style or a sporty driving style of a driver can be identified or discerned from the operating parameters detected during the movement of a vehicle along a driving path, in order then to change the prioritization of the multiple optimization constraints and adjust it to the individual driving style. The operating parameters can be detected by means of suitable sensors or can be estimated or determined from other parameters. It is also possible for a driver to specify a desired driving style via a vehicle communication system before or during a journey and for the prioritization to be adjusted accordingly.

A detected operating parameter can also be a target value, such as the actual energy consumption resulting from the operation of the hybrid powertrain system or a measurable emission of pollutants, such that the effects of the method can be detected during operation and if necessary taken into consideration for a controlled intervention in the optimization of the operation.

It is also conceivable for one or more operating parameters to be detected and used for a periodic or continuous adjustment of the optimization process. In this way, the actual effects of the influence of the optimization process on the operation of the hybrid powertrain system over the time-limited event response time can be detected or can be determined from the operating parameters. By comparing the actual reduction in the negative effects of the adverse operational events during a driving situation with previously detected negative effects that would arise without the use of the method, the effectiveness or the usefulness of individual optimization constraints can be checked and can be adjusted if necessary by means of a changed prioritization.

According to one embodiment, it is possible in principle for an allocated event response time to be set for each optimization constraint. The event response time specifies the time for which, once a forthcoming adverse operational event has been identified, the allocated optimization constraint is specified for the execution of the optimization process. The specified event response time can be identical for all optimization constraints. It is also possible for an individual event response time to be set for each adverse operational event and where appropriate for each individual optimization constraint, during which time the optimization constraint must be specified and taken into account in executing the optimization.

It is also conceivable that, if an adverse operational event is likely to arise, optimization parameters are detected over a predefined maximum response time, and that the event response time is ended once the detected optimization parameters satisfy a predefined event response termination criterion. Thus, for example, by detecting and evaluating operating parameters, it is possible to estimate whether the desired influencing of the operation of the hybrid powertrain system with the optimization constraint has already been achieved or is sufficiently underway that it is no longer necessary to further influence the optimization process by specifying an optimization constraint. It is also possible to extend the event response time if necessary, in order to bring about or where appropriate intensify the desired effect of the optimization constraint.

In practice, so-called particulate emissions are a particularly relevant constituent of the pollutant emissions of internal combustion engines. Using the method, it is possible to reduce particulate emissions without having to change route parameters per se, especially speed and/or acceleration, and without the need for extensive calculations or optimizations.

Driving situations in which the inventive method is particularly advantageous are so-called high-speed sections, such as occur in highway driving for example. In the case of the optimization processes known from the prior art, the internal combustion engine of the hybrid drive system is switched off because of the relatively low torque that is needed to maintain the driving speed. This causes the internal combustion engine to cool down. Experience shows that more overtaking occurs in high-speed sections, as a result of subjective perception of the surroundings by a person driving the vehicle or of information about the road ahead, for example junctions. Since such overtaking maneuvers require more torque than is available from the torque machine, the internal combustion engine has to be started up.

In the prior art methods, such overtaking maneuvers are carried out with a cold internal combustion engine. However, a cold internal combustion engine emits excessive amounts of particulates, because both the engine itself and an exhaust purification system operatively connected to the engine have not reached their respective operating temperatures.

By contrast, in the method according to the disclosure it is advantageously provided that the experience-based state-of-charge trajectory is adapted to the desired state-of-charge trajectory for the prediction period. In the high-speed phase described above, the application of the method means that the desired state-of-charge trajectory is increased, and the internal combustion engine is thus operated for longer. A portion of the cooling phase of the internal combustion engine can be reduced in this way, as a result of which the particulate emissions can also be reduced.

Another relevant operating parameter of hybrid powertrain systems is the state of the energy storage device associated with the hybrid powertrain. Most known energy storage devices are damaged by so-called deep discharging. Deep discharging within the meaning this application denotes a drop in the state of charge of the energy storage device to below a device-specific value known as the cut-off voltage. The deep discharge state is characterized in that the energy storage device is discharged to such an extent that the available electric voltage from the energy storage device drops below this cut-off voltage. The cut-off voltage is an energy storage device parameter that is dependent in particular on the type and design of the energy storage device.

To prevent a deep discharge of the energy storage device, the method thus provides that one of the optimization constraints, on the basis of which the desired state-of-charge trajectory is determined from the experience-based state-of-charge trajectory, is the state of charge below which the charge must never fall. The disclosure provides that the desired state-of-charge trajectory can be adjusted to a target state of charge, wherein the target state of charge is chosen such that a deep discharge of the energy storage device is prevented over the entire driving path.

Particularly preferably, the target state of charge can also be changed over the course of the driving path, so as to take account in particular of changing environmental influences. Thus, changing outside temperatures, for example, but also changes in an operating temperature of the energy storage device, can cause the deep discharge state to be reached at varying actual states of charge.

Another optimization criterion for hybrid powertrain systems that is particularly relevant in practice is the so-called drivability of a motor vehicle equipped with a hybrid powertrain system. Drivability is a subjective property of a motor vehicle, but it can be measured with physical parameters and can be formulated on the basis of mathematical forms.

In an advantageous implementation, it is thus provided that by means of the method the drivability of the vehicle equipped with the hybrid powertrain can be improved, in that the number of necessary start-ups of the internal combustion engine along the driving path and/or an operating time of the internal combustion engine at low speeds can be reduced by adjusting at least one optimization constraint. Low speed within the meaning of this application means speeds of less than 60 km/h, preferably less than 50 km/h.

It is advantageously provided that the optimization constraint to be adjusted is the target state of charge of the energy storage device. Particularly preferably, the target state of charge is lowered if further engine start-ups are to be prevented. A decision as to whether engine start-ups are to be prevented can be made on the basis of an assessment factor, for example.

It is thus advantageously provided that the method also comprises an assessment step in which first of all an assessment factor is established and then, on the basis of the established assessment factor, it is determined whether further engine start-ups should take place. An advantageously provided possibility for establishing the assessment factor comprises determining a time $T_{norm}$, which elapses on average between two engine start-ups of a known hybrid powertrain system. This time $T_{norm}$ is continually multiplied along the driving path by the number of engine start-ups that have already taken place and then divided by the time that has elapsed since the start of the journey. If the resulting assessment factor is greater than 1, then more engine start-ups than average have taken place so far and further engine start-ups should be prevented. It is advantageously provided here that the actual state of charge of the energy storage device is also taken into account so that a deep discharge of the energy storage device can be prevented.

Furthermore, it is also provided that the method can be adjusted so that the optimization criterion is a characteristic of a position of the vehicle equipped with the hybrid powertrain system along the driving path. It is thus possible, for example, that engine start-ups are prevented as far as possible in an urban area, in particular in order to reduce pollution levels there.

The disclosure also relates to a hybrid powertrain system for a vehicle, the hybrid powertrain system having a control device, a non-electrically operated drive motor and an electrically operated torque machine that is connected to an energy storage device in an energy-transferring manner, and wherein the drive motor and the torque machine are controlled by the control device and connected to an output element via a hybrid transmission, characterized in that the control device is configured in such a way that a method described above is carried out during an operation of the hybrid powertrain system.

Various embodiments of the inventive concept, as illustrated by way of example in the drawings, are described below in more detail.

DETAILED DESCRIPTION

Figure 1:
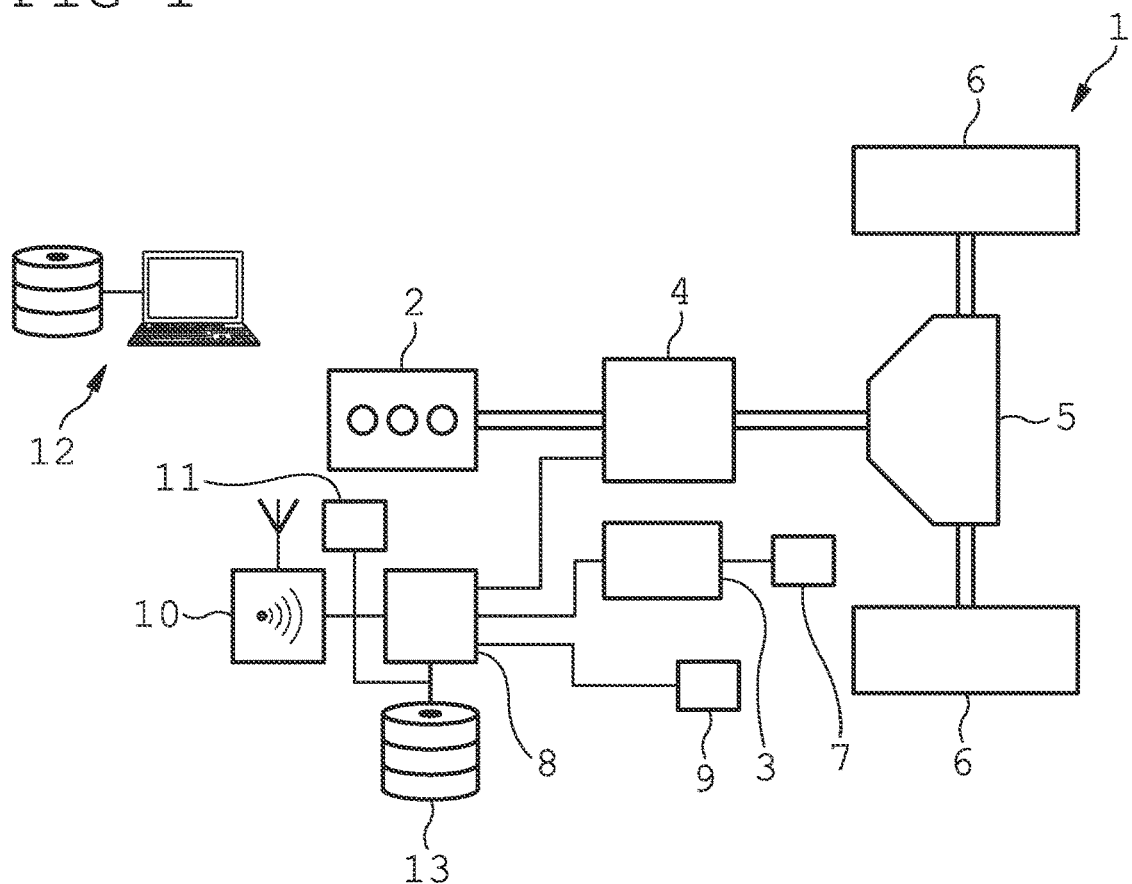
FIG. 1 shows a schematic representation of a hybrid powertrain system having an internal combustion engine, an electric torque machine, an energy storage device, a control device and a data transmission device for retrieving information about an experience-based state-of-charge trajectory from an external database.

FIG. 1 shows by way of example an inventive embodiment of a hybrid powertrain system 1. The hybrid powertrain system 1 has an internal combustion engine 2 and an electrically operated torque machine 3, which are connected by means of a common hybrid transmission 4 to an output element 5, via which a torque generated by the hybrid powertrain system 1 can be transferred to two drive wheels 6 of a vehicle (not shown in greater detail here). The electric torque machine 3 is connected to an electrical energy storage device 7 in an energy-transferring manner. The electric torque machine 3 can be used both to drive the drive wheels 6 and to convert energy from the energy storage device 7 into kinetic energy of the vehicle, or can be used as a generator and to convert kinetic energy of the vehicle or kinetic energy generated by the internal combustion engine 2 into electrical energy and to supply it to the energy storage device 7. The torque machine 3 can be, for example, a DC motor that can also be operated as a generator. It is also possible to incorporate multiple electric torque machines 3 into the hybrid powertrain system 1. Instead of the internal combustion engine 2, another non-electrically operated drive motor can also be used.

The hybrid powertrain system 1 has a control device 8. The control device 8 is in signal connection with the internal combustion engine 2, with the torque machine 3 and with the hybrid transmission 4, wherein the operation of the internal combustion engine 2, of the torque machine 3 and of the hybrid transmission 4 can be controlled with the control device 8. The control device 8 can moreover be connected to at least one sensor 9, with which operating parameters such as the current vehicle speed, etc., can be detected and transmitted to the control device 8.

The control device 8 is also in signal connection with a data transmission device 10 and with a data processing device 11. Using the data transmission device 10, information about an experience-based state-of-charge trajectory can be retrieved from an external database 12 and stored in the vehicle in an internal database 13. On the basis of the experience-based state-of-charge trajectory provided in this way, a desired state-of-charge trajectory can be established by the data processing device 11, having regard for example to current environmental conditions or driver's wishes, and is then used by the control device 8 to control and operate the hybrid powertrain system 1. The control device 8 is configured to carry out the inventive method described below for operating the hybrid powertrain system 1.

Figure 2:
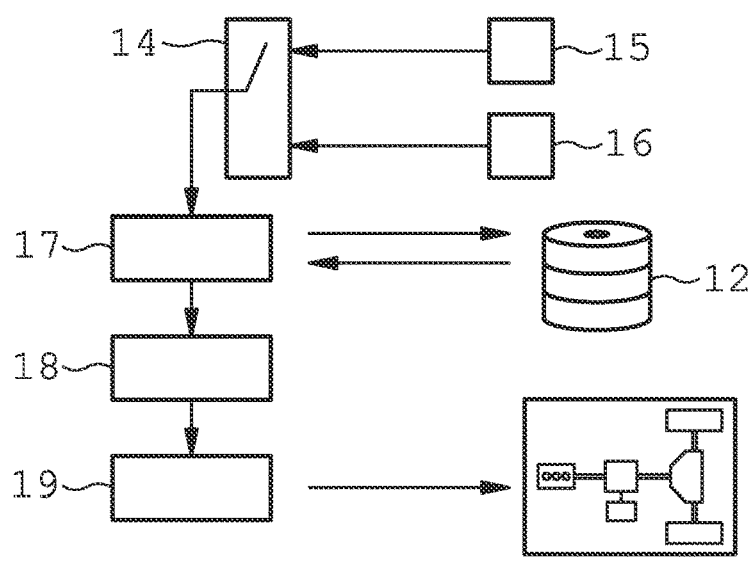
FIG. 2 shows a schematic representation of a procedure for operating the hybrid powertrain system shown in FIG. 1.

FIG. 2 shows a schematic representation of a sequence of the inventive method, wherein the essential steps for acquiring the experience-based state-of-charge trajectory and for establishing the desired state-of-charge trajectory are summarized. In a driving path determination step 14, an anticipated route is determined. Information can either be taken directly from an active navigation device 15 or can be compiled from a combination 16 of global position sensors (GPS) and digital map systems or from the current vehicle location and a driving path that is likely to be chosen.

In a data acquisition step 17, an experience-based state-of-charge trajectory or comprehensive information about the experience-based state-of-charge trajectory for the anticipated route is retrieved from the external database 12, wherein the experience-based state-of-charge trajectory is selected on the basis of predefined selection criteria from a number of experience-based state-of-charge trajectories stored in the external database 12. The external database 12 can be provided by the vehicle manufacturer, for example. The experience-based state-of-charge trajectory may already have been used as the basis for operating the hybrid powertrain system. However, it has not yet been adjusted to present conditions such as a current traffic situation or individual instructions from the driver. If the anticipated route was established from driver inputs into a navigation device 15 and the driver follows the suggestions made in this regard by the navigation device 15 or follows the proposed and hence anticipated route, the experience-based state-of-charge trajectory retrieved from the external database 12 can cover the entire route. In this case, there is no need for the experience-based state-of-charge trajectory to be updated during the journey. If the driver deviates from the anticipated route, a new anticipated route can be established and a new experience-based state-of-charge trajectory retrieved from the external database 12.

In an adjustment step 18, an adjustment to present circumstances is made on the basis of the experience-based state-of-charge trajectory. All available information about a current traffic situation along the anticipated route, such as increased traffic volume or roadworks or a mandatory diversion, or current weather conditions, etc., can be taken into account here. This information can also be acquired by communication between the vehicle and other vehicles on the anticipated route or by communication between the vehicle and fixed communication devices of a traffic infrastructure system. In addition, current driver instructions can be taken into account, such as a currently preferred driving style, for example fastest possible or energy-saving, or a preferred optimization criterion, such as a battery-saving or low-emission driving style. Then, on the basis of the experience-based state-of-charge trajectory, at least one optimization constraint, with which the experience-based state-of-charge trajectory is modified and a desired state-of-charge trajectory is established, is specified in the adjustment step. This desired state-of-charge trajectory can then be used to control and operate the hybrid powertrain system 1.

The effort required to determine the adjusted state-of-charge trajectory is relatively small, since the experience-based state-of-charge trajectory was retrieved from the external database 12 and is made available, with additional information where appropriate, without the need for extensive calculations or optimizations. The experience-based state-of-charge trajectory can cover a relatively long period, from a few minutes through to the entire journey time. Adjusting to present circumstances or establishing the desired state-of-charge trajectory to be used for operating the hybrid powertrain system, as required in adjustment step 18, requires relatively little computational effort in the vehicle. The desired state-of-charge trajectory modified in this way on the basis of the retrieved experience-based state-of-charge trajectory is then used in an implementation step 19 to control and monitor the operation of the hybrid powertrain system 1 via the control device 8. The adjustment step 18 can be continuously repeated, and the desired state-of-charge trajectory updated. If a deviation of the actual route from the anticipated route is identified, a new experience-based state-of-charge trajectory can and should be retrieved from the external database 12 in a new data acquisition step 17 and then modified in an adjustment step 18 and converted into a new desired state-of-charge trajectory.

Figure 3:
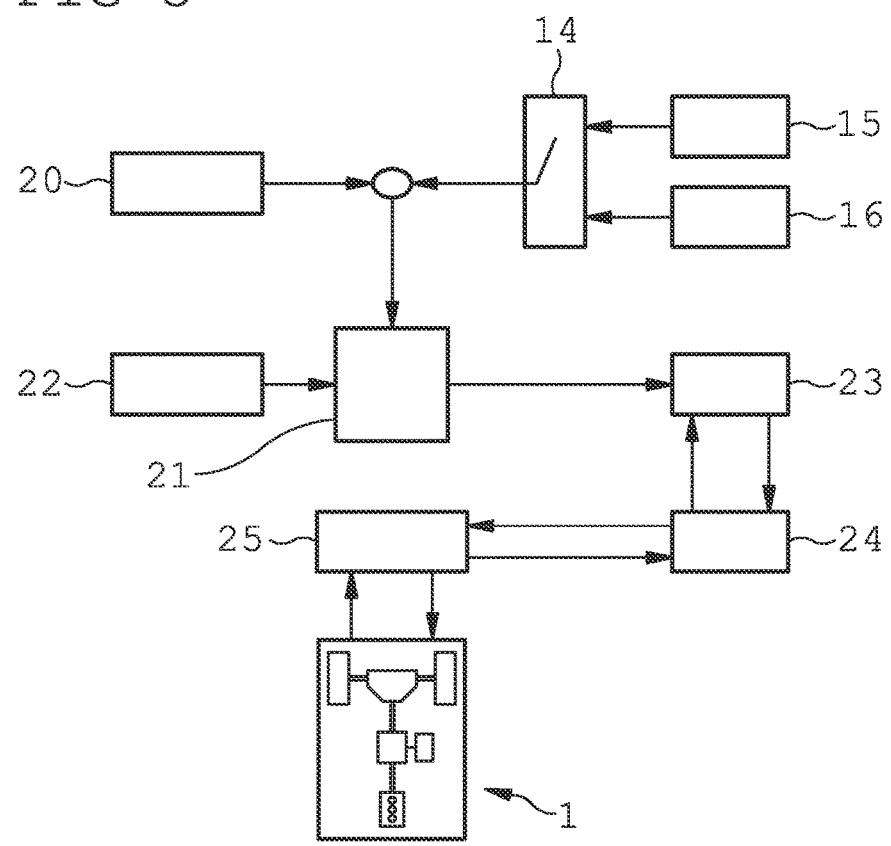
FIG. 3 shows a schematic representation of a procedure during the process of establishing and adjusting the desired state-of-charge trajectory on the basis of the experience-based state-of-charge trajectory.

FIG. 3 shows a schematic representation of a sequence of the inventive method, wherein the desired state-of-charge trajectory is adjusted by means of an additional optimization constraint for an adverse operational event that is likely to occur, for a predefined event duration. As already described above, an anticipated route is determined in the driving path determination step 14 for the duration of a prediction period. Information can either be taken directly from the active navigation device 15 or can be compiled from a combination 16 of global position sensors (GPS) and digital map systems or from the current vehicle location and a driving path that is likely to be chosen. With the aid of an additional module 20, the prediction period $\Delta t$ is specified, which in simple versions corresponds to a fixed duration but in more complex versions of the inventive method can be established and specified on the basis of the established driving path information and other parameters describing the driving situation, such as the vehicle speed for example.

In the data acquisition and adjustment steps 17 and 18, which are not shown separately in FIG. 3, an experience-based state-of-charge trajectory is acquired for the anticipated route, on the basis of which a desired state-of-charge trajectory is established.

Based on the desired state-of-charge trajectory and the anticipated vehicle drive power for the remainder of the route, control variables that are needed to control the hybrid powertrain system 1 are established from current operating parameters, such as the current speed and the anticipated driving path load, with the aid of a model 21.

A driver can make interventions 22 at any time, to increase or reduce the vehicle speed for example.

On the basis of the anticipated driving path load or the anticipated vehicle drive power, a verification module 23 checks whether or with what probability an adverse operational event, such as a gear change or an increase in speed following an extended period of driving without the internal combustion engine 2 switched on, will occur within the prediction period. If an adverse operational event is identified by the verification module 23 with a sufficiently high probability, an optimization constraint is generated and is sent to an optimization module 24 together with the control variables established from the model 21.

In the optimization module 24, a desired state-of-charge trajectory for a variation in the state of charge of the energy storage device over time is established by means of a suitable optimization process. The optimization process can be a multi-criteria scalarized optimization or another optimization process that is suitable for controlling the operation of a hybrid powertrain system. The optimization constraints that were generated where necessary with the verification module 23 must be taken into consideration here.

The control variables established or changed with the optimization process are sent to a control module 25, which converts the control variables into control commands with which the operation of the hybrid powertrain system 1 is controlled.

Figure 4:
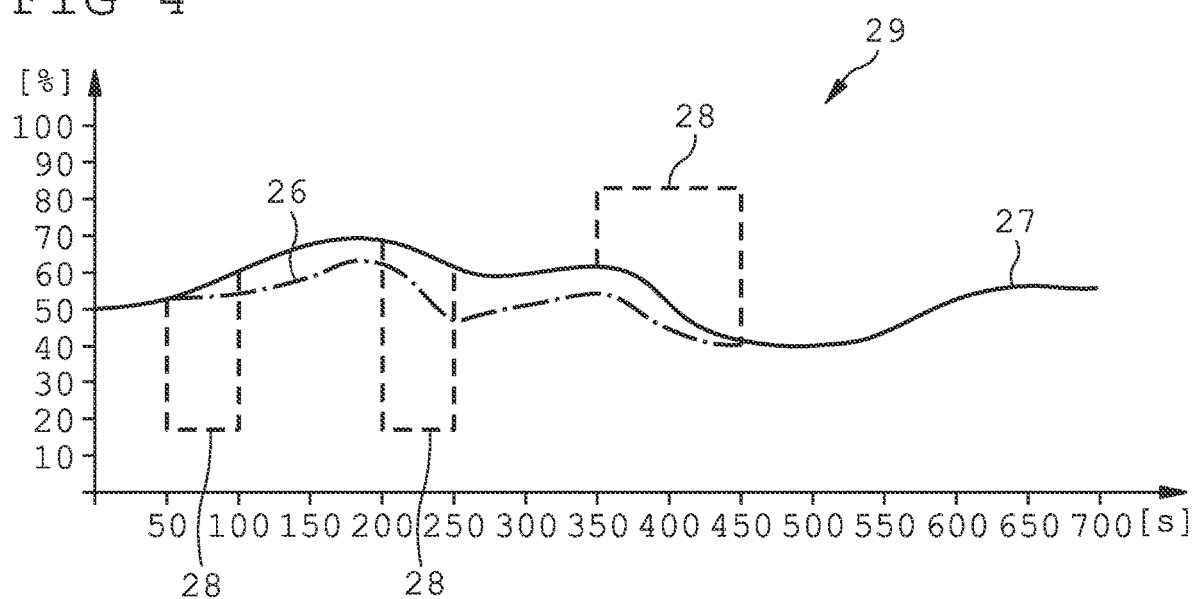
FIGS. 4 to 6b show schematic representations of the state of charge along a route.

FIG. 4 shows a schematic representation of the variation in the state of charge 26, the experience-based state-of-charge trajectory 27 and the desired state-of-charge trajectory 28 during an exemplary journey along a driving path. In the state-of-charge graph 29 shown in FIG. 4, a charge of the energy storage device in percent is plotted on the Y-axis. A time in seconds elapsed since a start of a journey along a driving path is plotted on the X-axis of the state-of-charge graph 29. The journey start time, located at the origin of coordinates of the state-of-charge graph 29, is denoted below by T.

The state of charge 26 corresponds to the actual charge of the energy storage device in percent and is represented by a dash-dotted line. The experience-based charge trajectory 27 was established before the start of the journey on the basis of operating data from hybrid powertrain systems of multiple vehicles and retrieved for the anticipated route from an external database. The experience-based charge trajectory 27 is represented by a solid line. In the state-of-charge graph 29 shown in FIG. 4, the prediction period $\Delta t$ of the experience-based charge trajectory 27 comprises 700 seconds.

In the example shown, the control device is able to make predictions with a prediction horizon of 200 seconds and to influence the desired state-of-charge trajectory 28. The desired state-of-charge trajectory 28 is represented by a broken line.

Up to T+50 seconds, the state of charge 26, the experience-based state-of-charge trajectory 27 and the desired state-of-charge trajectory 28 are congruent. At T+50 seconds, the control device establishes that a reduction in the state of charge 26 relative to the experience-based state-of-charge trajectory 27 is necessary and determines a desired state-of-charge trajectory 28 by means of which the established, necessary deviation is achievable. In the example shown, the desired state-of-charge trajectory 28 runs at 20% from T+50 seconds to T+100 seconds, causing the state of charge 26 to depart from the experience-based state-of-charge trajectory 27. From T+100 seconds, the experience-based state-of-charge trajectory 27 and the desired state-of-charge trajectory 28 are congruent again.

At T+200 seconds, the control device establishes that a further correction of the state of charge 26 relative to the experience-based state-of-charge trajectory 27 is necessary. To this end, the desired state-of-charge trajectory 28 is again lowered to 20% from T+200 seconds to T+250 seconds. The state of charge 26 of the energy storage device follows this adjustment and between T+200 seconds and T+250 seconds the gap between the state of charge 26 and the experience-based state-of-charge trajectory 27 increases.

At T+350 seconds, the control device establishes that the gap between the state of charge 26 and the experience-based state-of-charge trajectory 27 should be reduced. To this end, the desired state-of-charge trajectory 28 is raised to 80% from T+350 seconds to T+450 seconds. The state of charge 26 follows this adjustment and the gap between the state of charge 26 and the experience-based state-of-charge trajectory 27 is reduced until the state of charge 26 is again following the experience-based state-of-charge trajectory 27.

Figure 5A:
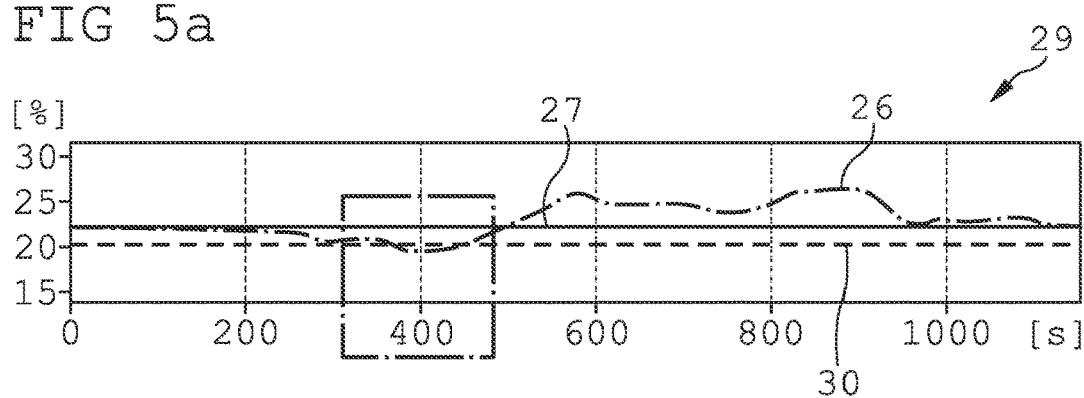
Figure 5B:
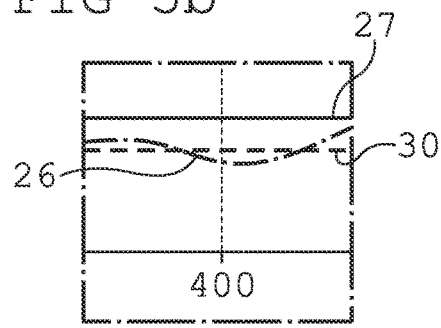

FIGS. 5*a* and 5*b* show a curve for the state of charge 26 over a 1200-second route. FIG. 5*b* shows an enlargement of details of FIG. 5*a* in the area of T+400 seconds. In the example shown, the experience-based state-of-charge trajectory 27 is at a constant value of 22%, which means that the hybrid powertrain system is supplied with electrical energy from the energy storage system provided that the state of charge 26 does not fall below this value. As soon as the state of charge 26 drops below 22%, the operating time of the internal combustion engine is increased in order to increase the state of charge 26.

A deep discharge line 30 can also be seen in FIGS. 5*a* and 5*b*. This is at a value of 19.9%. As soon as the state of charge 26 of the energy storage device falls below this value, the energy storage device is in a deep discharge state and is at risk of being damaged. As is clear from FIG. 5*b*, the state of charge 26 drops below the deep discharge line 30 in the area of T+400 seconds if a constant value of 22% is set for the experience-based state-of-charge trajectory 27.

Figure 6A:
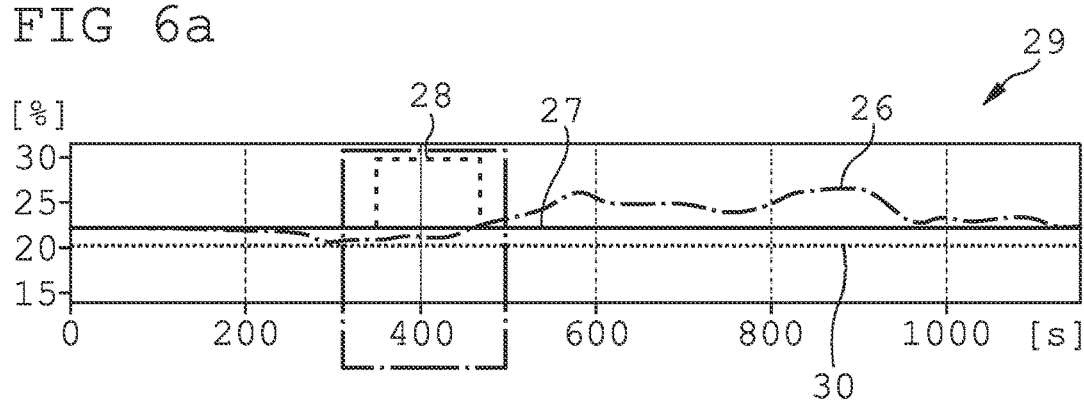
Figure 6B:
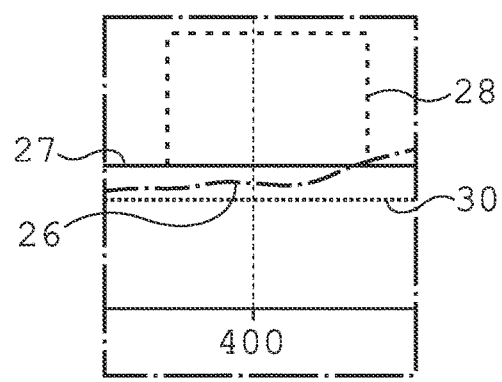

FIGS. 6*a* and 6*b* show an alternative curve for the state of charge 26 over the same route as shown in FIGS. 5*a* and 5*b*. The control device is programmed to prevent the state of charge from dropping below the deep discharge line 30 under any circumstances. Accordingly, the desired state-of-charge trajectory 28 is raised by the control device to a state of charge of 2% in the area in which the value is likely to drop below the deep discharge line 30 if the experience-based state-of-charge trajectory 27 is used. This rise begins earlier than T+400 seconds so as to prevent the value from dropping below the deep discharge line 30 under any circumstances.

Figure 7A:
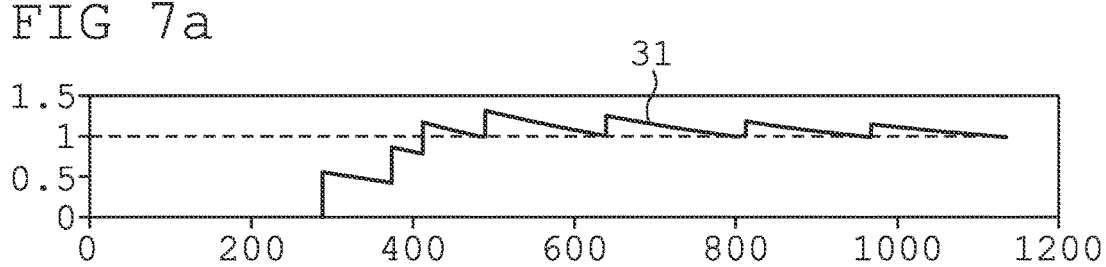
FIG. 7a shows a course in the assessment factor along a route.

FIG. 7*a* shows a schematic representation of a variation in an assessment factor 31 provided in accordance with the disclosure, along an alternative 1200-second route. The assessment factor 31 rises sharply when the internal combustion engine is started and drops over time. A value of 1 for the assessment factor 31 means that the number of previous engine start-ups of the internal combustion engine is average. If the assessment factor 31 is greater than 1, then a disproportionately large number of engine start-ups of the internal combustion engine is taking place. The variation in the assessment factor 31 as shown in FIG. 7*a* arises if the assessment factor 31 is taken into account in the inventive method in such a way that further engine start-ups of the internal combustion engine are prevented for as long as the assessment factor 31 is greater than 1.

Figure 7B:
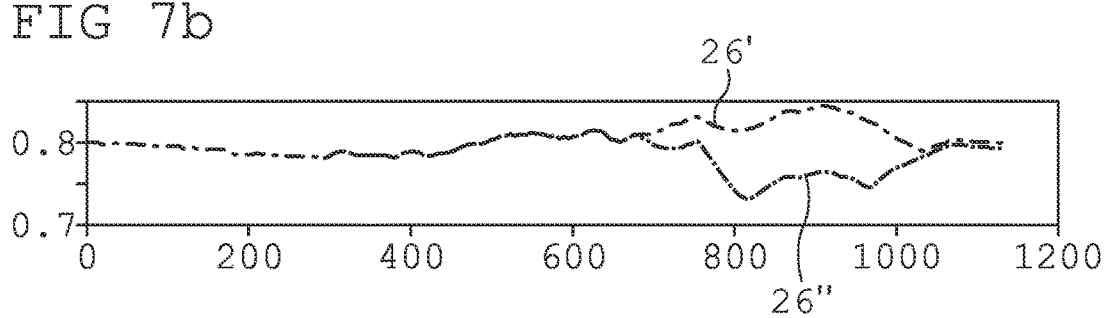
FIG. 7b shows desired state-of-charge trajectories along the route from FIG. 7a, FIG. 8a shows a speed profile along a route.

FIG. 7*b* shows the curve for a first state of charge 26' and the curve for a second state of charge 26". The first state of charge curve 26' arises if the hybrid powertrain system is operated without taking the assessment factor 31 into account. The second state of charge curve 26" comes about if the assessment factor 31 is taken into consideration.

Figure 8A:
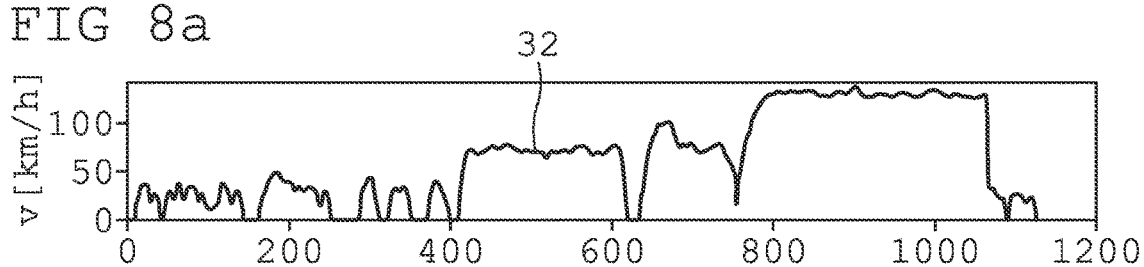
FIG. 8b shows courses in cumulative numbers of engine start-ups along the route from FIG. 8a, and FIG. 8c shows courses in states of charge along the route from FIGS. 8a and 8b.
Figure 8B:
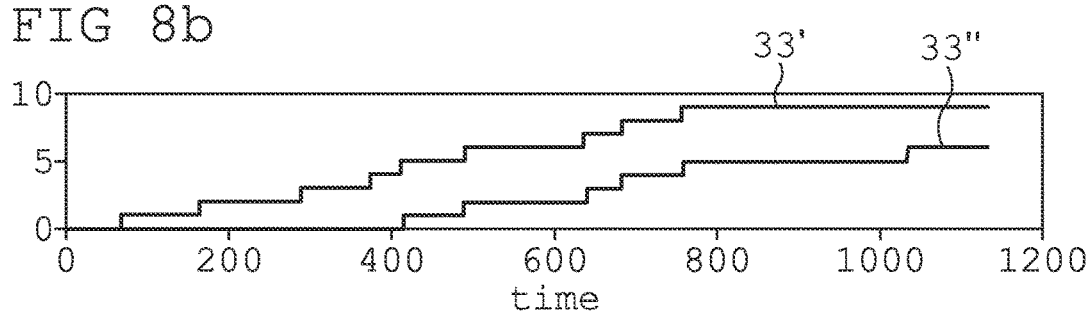
Figure 8C:
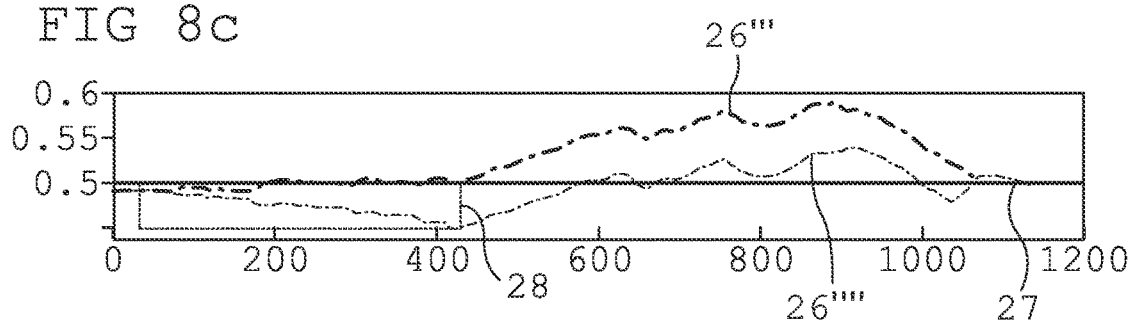

FIGS. 8*a* to 8*c* show how taking a driving speed 32 into consideration in the inventive method influences a number of engine start-ups 33 and the state of charge 26. FIG. 8*a* shows the driving speed 32 along another alternative 1200-second route. Up to approximately time T+400 seconds, the driving speed 32 is below 50 km/h. The control device is programmed in such a way that at a driving speed 32 of less than 50 km/h, operation of the internal combustion engine should preferably be avoided, since such a speed profile suggests urban driving, where local emissions should be prevented where possible.

FIG. 8*b* shows a first curve for the cumulative number of engine start-ups 33' and a second curve for the cumulative number of engine start-ups 33". The first curve for the cumulative number of engine start-ups 33' arises if the previously described optimization criterion, namely that at a driving speed 32 of less than 50 km/h, the internal combustion engine should preferably not be operated, is not taken into consideration. In the presumed urban driving area, i.e. up to time T+approximately 400 seconds, this results in 4 engine start-ups 33'.

By contrast, the second curve for the cumulative number of engine start-ups 33" arises if the previously described optimization criterion is taken into consideration in the inventive method. As a result, through the application of the inventive method, no engine start-ups 33" occur in the presumed urban driving area.

FIG. 8*c* shows that the optimization constraint that is adjusted to take account of the optimization criterion is the desired state-of-charge trajectory 28. The FIG. also shows another two state of charge curves, namely a third state of charge curve 26''' and a fourth state of charge curve 26''''.

In the example shown, the experience-based state-of-charge trajectory 27 is at a constant value of 50%, which means that the hybrid powertrain system is supplied with electrical energy from the energy storage system provided that the state of charge 26 does not fall below this value. In order to prevent engine start-ups 33 of the internal combustion engine, the control device reduces the desired state-of-charge trajectory 28 to 45% in the presumed urban driving area. This results in the fourth state of charge curve 26''''. At the end of the presumed urban driving, i.e. from T+approximately 400 seconds, the control device increases the desired state-of-charge trajectory 25 to 50% again such that the energy storage system is charged to a state of charge of 50% until the end of the route.

LIST OF REFERENCE CHARACTERS

1. Hybrid powertrain system
2. Internal combustion engine
3. Torque machine
4. Hybrid transmission
5. Output element
6. Drive wheels
7. Energy storage device
8. Control device
9. Sensor
10. Data transmission device
11. Data processing device
12. External database
13. Internal database
14. Driving path determination step
15. Navigation device
16. Combination
17. Data acquisition step
18. Adjustment step
19. Implementation step
20. Module
21. Model
22. Intervention
23. Verification module 24. Optimization module
25. Control module
26. State of charge
27. Experience-based state-of-charge trajectory
28. Desired state-of-charge trajectory
29. State-of-charge graph
30. Deep discharge line
31. Assessment factor
32. Driving speed
33. Engine start-up

The invention claimed is:

1. A method for operating a vehicle with a hybrid powertrain system (1), wherein the hybrid powertrain system (1) comprises an internal combustion engine (2) and an electrically operated torque machine (3) that is connected to an energy storage device (7) in an energy-transferring manner, and wherein the internal combustion engine (2) and the torque machine (3) are controlled by a control device (8) and connected to an output element (5) via a hybrid transmission (4), the method comprising:
  establishing a desired state-of-charge trajectory (28) for a variation in a state of charge (26) of the energy storage device (7) over time, for a prediction period ($\Delta t$), based on an anticipated route, and
  optimizing operation of the hybrid powertrain system (1) with respect to the desired state-of-charge trajectory (28), taking account of an estimated anticipated vehicle drive power, using an optimization process and controlling the operation with the control device (8),
  wherein before a start of the prediction period ($\Delta t$),
    an experience-based state-of-charge trajectory (27) for the anticipated route, covering at least the prediction period ($\Delta t$), is retrieved from an external database (12), and
    the desired state-of-charge trajectory (28) is established by modifying the experience-based state-of-charge trajectory (27) with at least one optimization constraint.

2. The method according to claim 1,
wherein the experience-based state-of-charge trajectory (27) was established based on operating data from hybrid powertrain systems of multiple vehicles.

3. The method according to claim 1,
wherein the experience-based state-of-charge trajectory (27) retrieved from the external database (12) is selected from a plurality of state-of-charge trajectories stored in the external database (12), and
wherein at least one vehicle parameter of the hybrid powertrain system (1) is used as a selection criterion for the selection.

4. The method according to claim 1,
wherein the experience-based state-of-charge trajectory (27) retrieved from the external database (12) is selected from a plurality of state-of-charge trajectories stored in the external database (12), and
wherein at least one journey parameter established based on at least one operating parameter of the vehicle, established during at least one past journey with the vehicle, is used as a selection criterion for the selection.

5. The method according to claim 1,
wherein the at least one optimization constraint is specified by a driver before the start of the prediction period ($\Delta t$).

6. The method according to claim 1,
wherein, taking account of an anticipated driving path load, an anticipated vehicle drive power is estimated, wherein at least one optimization constraint is specified for previously identified adverse operational events,
wherein based on the estimated anticipated vehicle drive power it is estimated whether an adverse operational event will occur within an event prediction period, and
wherein, if an adverse operational event is likely to occur over a time-limited event response time, at least one optimization constraint allocated to this adverse operational event is specified for controlling operation of the hybrid powertrain system (1).

7. The method according to claim 6,
wherein at least one previously defined adverse operational event would lead to an increased emission of pollutants and
wherein the pollutant emission is reduced by comparison by means of an optimization constraint allocated to the adverse operational event.

8. The method according to claim 6,
wherein at least one previously defined adverse operational event would bring about an adverse temperature evolution within the hybrid powertrain system (1) or an adverse state of the energy storage device (7), and
wherein an evolution of a temperature or the state of the energy storage device (7) is made more favorable by comparison by means of an optimization constraint allocated to the adverse operational event.

9. The method according to claim 6,
wherein, based on a predefined prioritization, one of the optimization constraints allocated to these adverse operational events is selected and specified for controlling the operation of the hybrid powertrain system (1) if more than one optimization constraint is allocated to the identified adverse operational event.

10. The method according to claim 6,
wherein, based on a predefined prioritization, an allocated optimization constraint is selected and specified for controlling the operation of the hybrid powertrain system (1) if more than one adverse operational event is identified within the event prediction period.

11. The method according to claim 9,
wherein, while the hybrid powertrain system (1) is operating, operating parameters are detected and
wherein, based on the detected operating parameters, a prioritization of the allocated optimization constraints is checked and if necessary is changed.

12. The method according to claim 6,
wherein an allocated event response time ($t_{ER}$) is specified for each optimization constraint.

13. The method according to claim 6,
wherein, if an adverse operational event is likely to arise, optimization parameters are detected over a predefined maximum response time, and
wherein the event response time ($t_{ER}$) is ended once the detected optimization parameters satisfy a predefined event response termination criterion.

14. A hybrid powertrain system (1) for a vehicle,
wherein the hybrid powertrain system (1) comprises
  a control device (8),
  a non-electrically operated drive motor (2) and
  an electrically operated torque machine (3) that is connected to an energy storage device (7) in an energy-transferring manner, and
wherein the drive motor (2) and the torque machine (3) are controlled by the control device (8) and connected to an output element (5) via a hybrid transmission (4), wherein the control device (8) is configured in such a way that the method defined in claim 1 is carried out during an operation of the hybrid powertrain system (1).

\* \* \* \* \*